Oct. 19, 1937.  C. Z. SUTTON ET AL  2,096,013
DISPENSING MACHINE
Filed Sept. 22, 1934   5 Sheets-Sheet 1
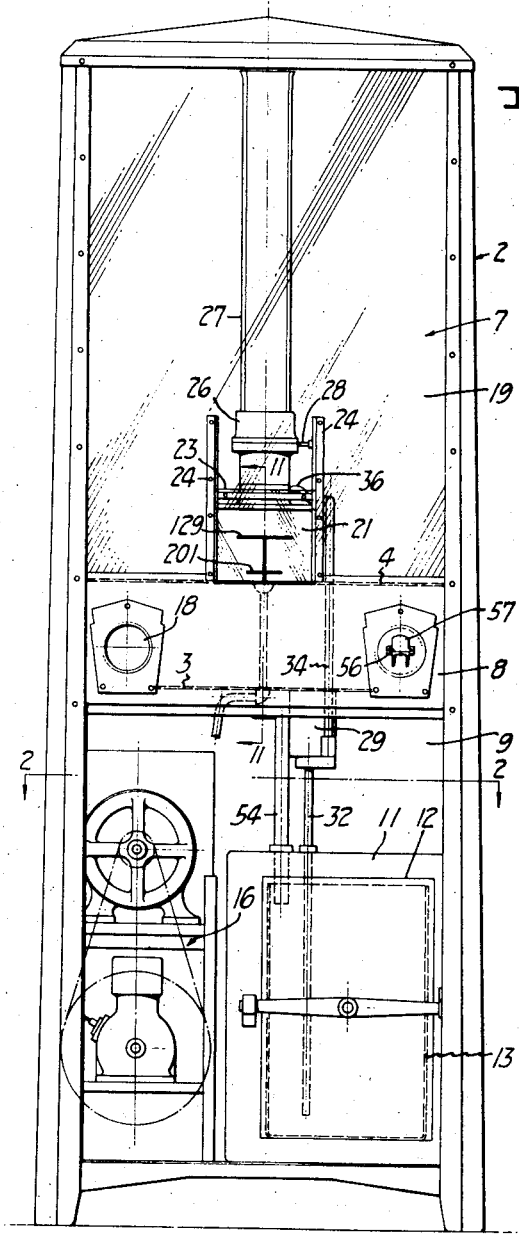
FIG_1_
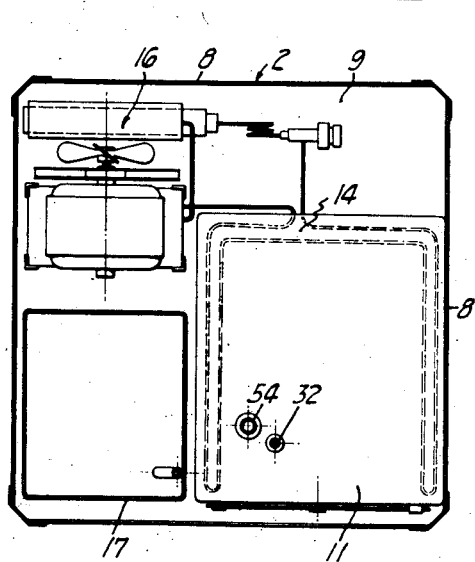
FIG_2_
INVENTORS
Charles Zook Sutton
Otto M. Eash
BY
ATTORNEY

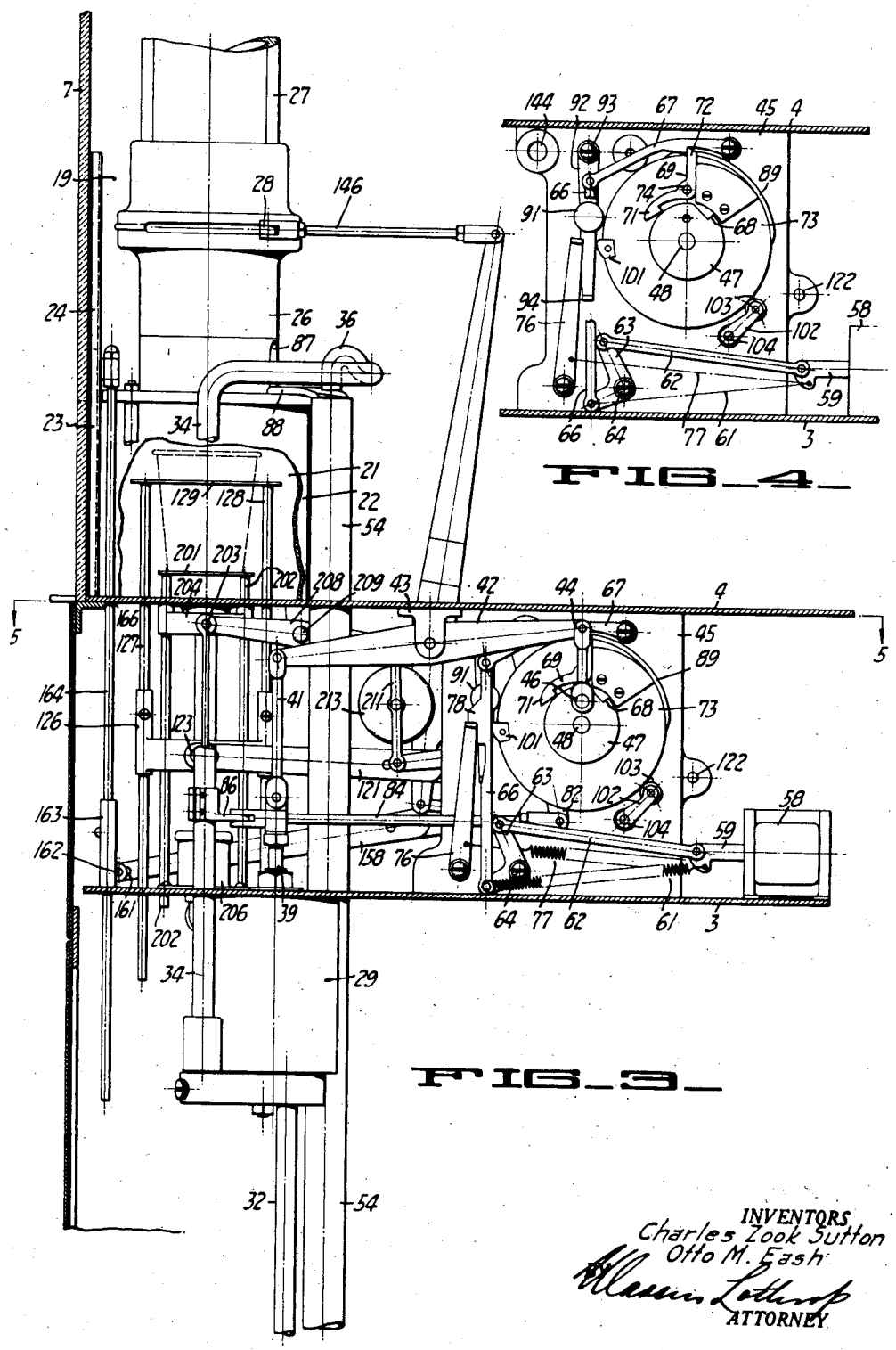

Oct. 19, 1937.  C. Z. SUTTON ET AL  2,096,013
DISPENSING MACHINE
Filed Sept. 22, 1934   5 Sheets-Sheet 3
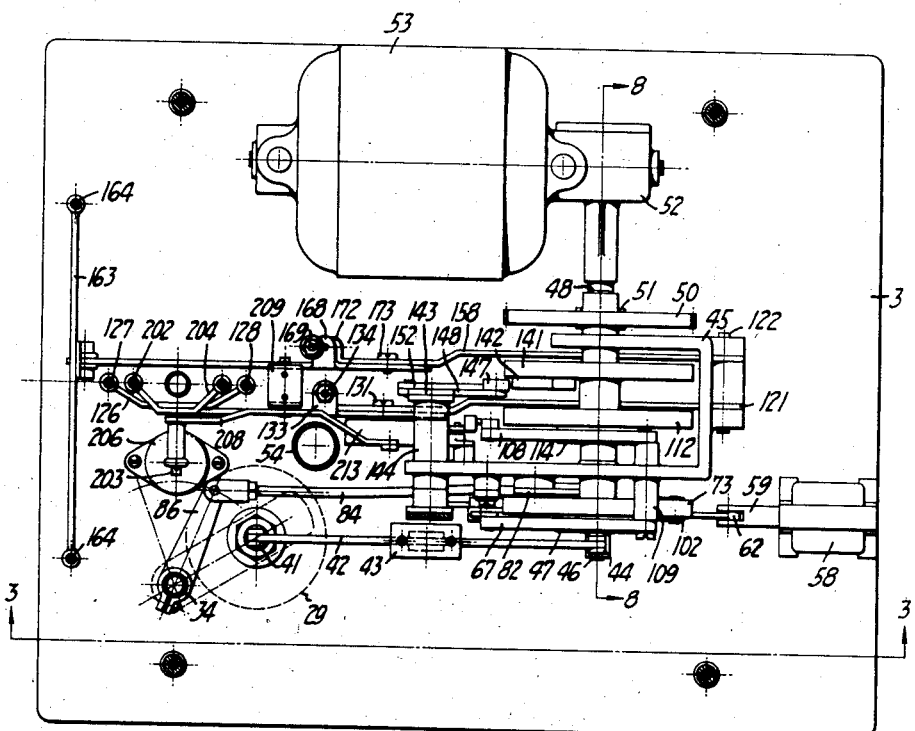
FIG_5_
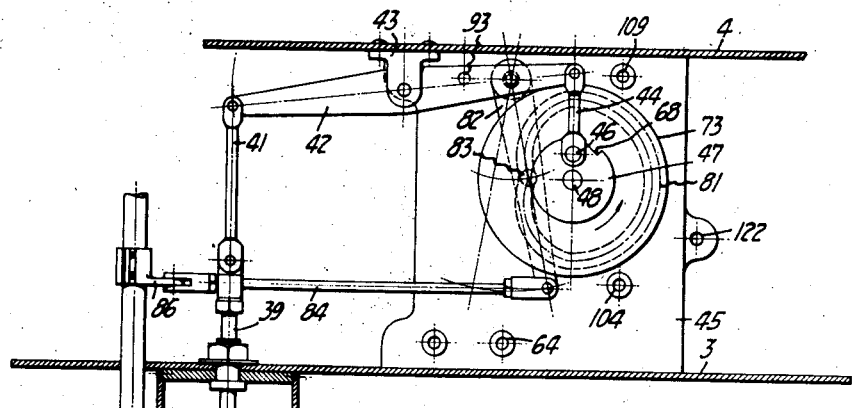
FIG_6_
INVENTORS
Charles Zook Sutton
Otto M. Eash
ATTORNEY Oct. 19, 1937.  C. Z. SUTTON ET AL  2,096,013
DISPENSING MACHINE
Filed Sept. 22, 1934  5 Sheets-Sheet 4
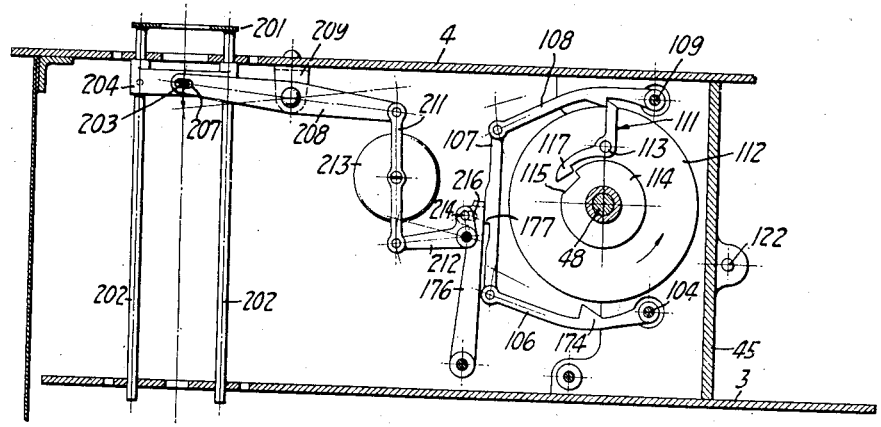
FIG_7_
FIG_8_
FIG_9_
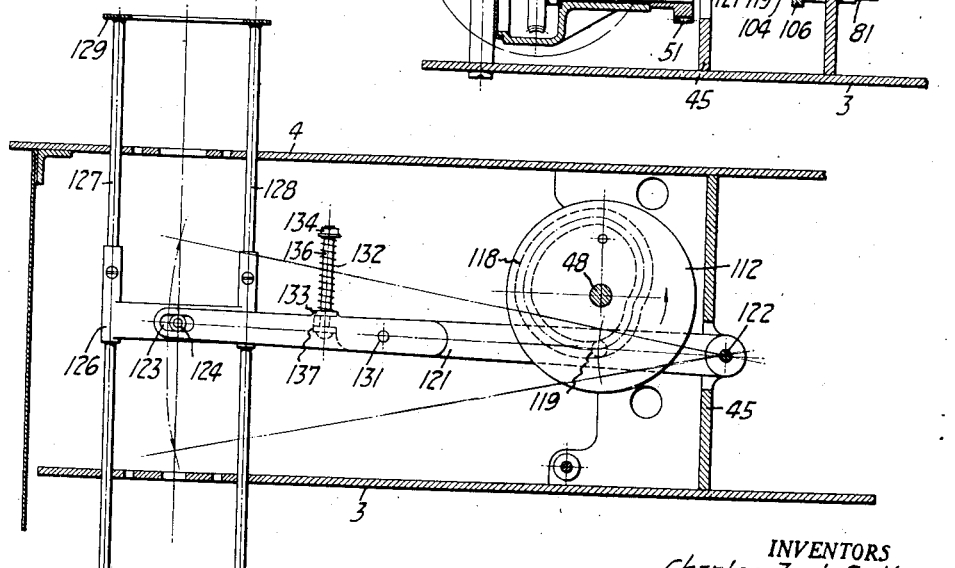
INVENTORS
Charles Zook Sutton
Otto M. Eash
ATTORNEY

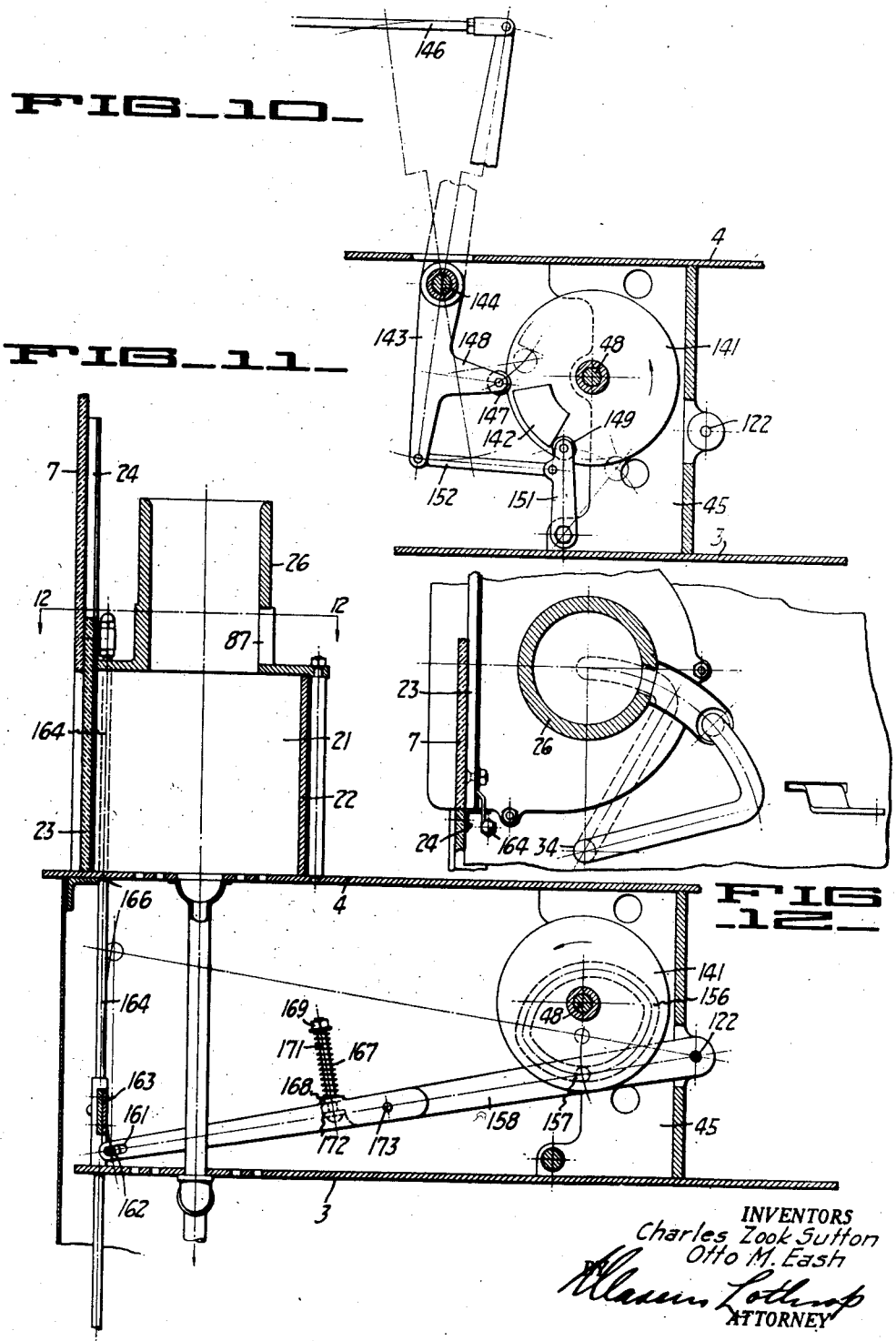

Patented Oct. 19, 1937

2,096,013

UNITED STATES PATENT OFFICE 2,096,013

DISPENSING MACHINE

Charles Zook Sutton and Otto M. Eash, Oakland, Calif., assignors, by mesne assignments, to Robert G. Hooker, Junior, of San Francisco, Calif.

Application September 22, 1934, Serial No. 745,077

16 Claims. (Cl. 225—21)

The invention relates to means for dispensing liquids in predetermined quantities in response to individual actuation of the dispenser.

An object of the invention is to provide a machine for dispensing beverages such as buttermilk, tomato juice, pineapple juice, and the like.

Another object of the invention is to provide a machine for dispensing a container such as a cup which has freshly been filled with such a beverage.

Another object of the invention is to effect the filling of the cup within the view of the purchaser but screened from contact by the purchaser until such time as the cup is filled.

Another object of the invention is continually to condition the beverage whether it is actively being dispensed or not.

A further object of the invention is to provide an automatic dispensing mechanism which can cause no injury to a user.

The foregoing and other objects are attained in the embodiment of the invention shown in the drawings, in which—

Fig. 1 is a front elevation of a dispensing machine constructed in accordance with the invention, portions of this structure being disclosed by the removal of the front lower cover.

Fig. 2 is a cross-section the plane of which is indicated by the line 2—2 of Fig. 1.

Fig. 3 is a side elevation of the major part of the actual dispensing mechanism, portions being in cross-section on the lines 3—3 of Fig. 5 to increase the clarity of the disclosure.

Fig. 4 is a side elevation, certain portions being removed, of the main clutch mechanism.

Fig. 5 is a sectional plan, the plane of section being indicated by the line 5—5 of Fig. 3.

Fig. 6 is a view similar to Fig 3 but with certain parts removed and with the pump in diametral cross-section.

Fig. 7 is a side elevation of the secondary clutch and its associated mechanisms.

Fig. 8 is a cross-section the plane of which is indicated by the line 8—8 of Fig. 5.

Fig. 9 is a side elevation of the cup guiding mechanism and associated linkage.

Fig. 10 is a side elevation of the cup dispenser actuator and associated parts.

Fig. 11 is a cross-section through the central part of the dispensing chamber, the plane of section being on lines 11—11 of Fig. 1, showing the gate in cross-section and its driving mechanism in side elevation.

Fig. 12 is a fragmentary cross-section the plane of which is indicated by the line 12—12 of Fig. 11, particularly showing the swinging spout.

In its preferred form, the dispensing machine of our invention comprises means for conditioning a beverage for dispensation, that is, chilling it and agitating it, together with means actuated in response to a predetermined impulse, such as the introduction of a coin into the machine, for setting into motion mechanism for releasing a container such as a cup, filling the container with a predetermined amount of the beverage, and then rendering the filled cup accessible for withdrawal from the machine, all combined with mechanism effective after withdrawal of the filled cup from the machine for restoring the parts to their original condition ready for a subsequent cycle of operation.

While the dispensing machine of our invention is of course susceptible of embodiment in various different forms, we have illustrated it herein as it has been successfully constructed in order to display and dispense pineapple juice. This beverage is in best condition for consumption when it is chilled somewhat from ordinary room temperature, and is further peculiar in that it contains sufficient solids so that a relatively continuous agitation is desirable in order that the homogeneity of the beverage can be maintained.

In accordance with the invention, therefore, we preferably provide an enclosing cabinet 2 which is suitably constructed to provide a framework 3 for the dispensing machine. Preferably, above a central platform 4 there are provided transparent glass walls 7 so that the interior may be readily inspected, while below the central platform the enclosure is completed by metallic cover plates 8 which conceal the interior mechanism. Situated within the lower chamber 9 confined by the walls 8 is a heavily insulated compartment 11 provided with a removable door 12 within which a container 13 of beverage can be installed. Likewise situated within the compartment 12 is the absorption coil 14 of a refrigerating mechanism generally designated 16. This mechanism is of standard construction and is therefore not described in detail. Occupying part of the space within the compartment 9 is a container 17 for the reception of used cups. Access to this container is had through an aperture 18 piercing the front wall of the cabinet.

With the structure as so far described, there is provided means for maintaining at the proper temperature a suitable supply of beverage to be dispensed.

In the upper portion of the cabinet, in the space confined by the transparent walls 7, there is segregated from the main compartment 19 a dispensing compartment 21 which is bounded by a metal wall 22 and is closed by a gate 23 preferably of glass which can rise and fall in guides 24, so that the compartment 21 can be connected with or isolated from the interior of the cabinet. Located just above the compartment 21 is a standard cup-dispensing reservoir and mechanism 26, of which various types are commercially available so that the mechanism is not described in detail. Suffice it to say that the mechanism 26 includes a column 27 for paper cups and is provided with an actuating lever 28 which, when afforded a complete oscillation, dispenses a single cup and restores the mechanism to condition for a subsequent operation.

In accordance with our invention, the beverage contained in the reservoir 12 is continually circulated in order that it may be agitated and maintained in a homogeneous condition, but upon actuation of the machine a predetermined portion is dispensed into a cup situated within the compartment 21, after which the gate 23 is lifted so that the cup can be withdrawn. Following this operation, the machine is restored to original condition. To circulate the beverage, therefore, there is provided a pump of any suitable character, there being illustrated in Fig. 6 a piston pump, generally designated 29, comprising a cylinder 31 suitably fastened to the framework 3 and communicating through an outlet pipe 32, provided with a check valve 33, with the interior of the container 13. The pump is likewise provided with an outlet 34, having a suitable check valve 35, which extends into the upper compartment 19 and is bent to terminate in a spout 36.

Adapted to reciprocate within the cylinder 31 is a piston 38 fastened on a piston rod 39 to which a pitman 41 is pivoted. The pitman is connected to one end of a walking beam 42 fulcrumed on a central support 43 secured to the framework 3, and at its opposite end connected by a rod 44 to an eccentric pin 46 mounted on a crank plate 47. A through shaft 48 carries the crank plate 47 and is journaled in bearings 49 in a casting 45. The shaft 48 also carries a master gear 50 with which meshes a pinion 51 connecting through a suitable speed reducer 52 to a source of power such as an electric motor 53. Upon energization of the electric motor, the shaft 48 is rotated and, through the intermediate mechanism, the piston 38 is reciprocated, thus extracting beverage from the container 13 through the inlet 32 and expelling it through the outlet 34 and the spout 36. A return circuit is normally provided by a return tube 54 leading to the container 13. Since the motor 53 is continually energized during the operation of this structure, there is a continual circulation of the beverage to be dispensed, to maintain its condition uniform.

Whenever a drink is to be dispensed, a coin is introduced into a coin slot 56 and a slide 57 is actuated by the operator. This structure is not described in detail since there are numerous, well understood standard mechanisms of this type. The actuation of the slide 57 is effective to energize a solenoid 58 which attracts its core 59 in response to such energization and against the urgency of a coil spring 61. The movement of the core 59 is effective upon a link 62 to oscillate a bell crank 63 pivoted on the framework, as at 64, and connected to a latch lever 66. The latch lever in turn, as shown especially in Figs. 3 and 4, is connected to a lever 67 pivoted to control a unicycle clutch. The clutch includes a notch 68 cut in the periphery of the crank disc 47 which is engageable by a bell crank 69 having a pawl 71 at one end and an actuating arm 72 at the other end. When the lever 67 is lifted, the pawl 71 is enabled to engage with the notch 68 as the disc 47 rotates under the influence of the motor 53, so that the disc 73, to which the bell crank is pivoted by a pin 74, is then joined to the crank disc 47 and the two rotate in unison pending release of the pawl 71.

Since the solenoid 58 is liable to be de-energized very shortly after it is energized, we provide a locking lever 76 which is biased by a spring 77 to ride under a shoulder 78 on the link 66, when such link is lifted, and to hold the link in lifted position until the locking lever 76 is tripped from beneath the shoulder 78. This type of clutch and holding mechanism is utilized in order that the pump may be synchronized with the remaining operations of the machine. The clutch is so related that the pump has completed about half of its suction stroke when the disc 73 is coupled to the driving shaft 48.

Further rotation of the disc 47 causes unitary rotation therewith of the disc 73, whereupon a cardioid cam groove 81 cut in the reverse face of the disc 73 is effective to oscillate a lever 82 pivoted to the casting 45 and carrying a cam follower pin 83 riding in the groove 81. The lever 82 connects through a link 84 with a radial arm 86 on the discharge pipe 34, so that the pipe is rotated sufficiently to swing the spout 36 from the position shown in Fig. 12 through an aperture 87 in the cup support 26 and into a central position above a cup previously deposited in the dispensing chamber 21. The timing is such that at about the time the spout is centrally located over the cup, the pump piston begins its discharge stroke and discharges a volume of beverage into the receiving cup. At the conclusion of the discharge stroke of the pump, the cam groove 81 is effective upon the lever 82 and the link 84 to swing the spout 36 back through the aperture 87 into the position shown in Fig. 12. Any drip from the spout is caught by a tray 88 and is returned through the drain.

In accordance with the mechanism as so far described, one cycle of operation of the pump is effective to discharge the beverage into a receiving cup rather than back into the storage tank.

In order that but one cycle of the pump be effective to pump into the receiving cup, we provide on the periphery of the wheel 73 a raised cam surface 89 which is effective upon a follower 91 projecting from a lever 92 pivoted on a pin 93. When the lever 92 is actuated, an overturned end 94 thereon swings against the locking lever 76 and dislodges the locking lever from beneath the shoulder 78 on the link 66, so that the clutch is released from active position at the conclusion of one cycle of rotation. The parts thus return to their original positions, being held in original location pending a subsequent tripping of the main clutch.

During the rotation of the discs 73, and at about the time the pump begins to discharge beverage into the waiting cup, a cam 101 is effective to rock a lever 102, provided with a roller follower 103, thereby oscillating a shaft 104 on which the lever is mounted. Oscillation of this shaft produces oscillation of a lever 106 which is joined by a link 107 to a comparable lever 108 pivoted, as at 109, to the casting. This movement lifts the lever 108 to permit a clutch lever 111, pivotally mounted on a disc 112 by a pin 113, to engage with a driving disc 114 carried on the shaft 48 and having a notch 115 to receive a pawl 117 located at the extremity of the lever 111.

When the disc 112 is coupled to the driving shaft, a cam groove 118 cut in the reverse face of the disc 112, is effective upon a follower pin 119 carried by a two-part lever 121. One end of this lever is pivoted by a pin 122 to the casting, and the other end is provided with a slot 123 encompassing a pin 124 carried by a yoke 126. A pair of rods 127 and 128, respectively, slidably mounted in the frame work of the machine, are joined by the yoke 126 and by a cup guiding ring 129. The shape of the groove is such that when the disc 112 is rotated the lever 121 is actuated to lower the cup ring 129 against the framework of the mechanism during the first half of such rotation.

If for any reason the ring 129 should be obstructed in its lowering movement, there is provided a yielding or buckling means in the lever 121. This takes the form of the two parts of the lever, the parts being connected by a pivot pin 131 and by a spring 132 which is confined between a perforated lip 133 on one part of the lever and an adjusting nut 134 at the extremity of a through bolt 136 piercing an ear 137 on the other portion of the lever.

Operating in conjunction with the disc 112 is a disc 141 which on its obverse face carries an axial cam 142 effective to oscillate a lever 143 in opposite directions. This lever is provided with a fulcrum 144 on the main framework of the mechanism, and at its upper end is pivotally connected to an actuating rod 146 extending to connect with the actuator 28 of the standard cup dispenser. The cam 142 is effective upon the lever 143 by first acting upon a roller follower 147 provided on an extension 148 of the lever 143, and then acting upon a roller 149 mounted at the extremity of the lever 151 pivoted to the main frame of the machine and connected by a link 152 to an extremity of the lever 143. The location of the cam 142 on the disc 141 is such that during the first half rotation of the disc 141 there is no effect upon the lever 143, but during the last half of the rotation of the disc 141 the actuator 28 is given a complete oscillatory cycle in order to release a single cup and to return to original position.

The reverse face of the disc 141, as particularly shown in Fig. 12, carries an oval cam groove 156 within which operates a follower pin 157 projecting from a lever 158, one end of which is mounted on the pin 122 projecting from the framework of the machine and the other end of which is provided with a slot 161 encompassing a pin 162 projecting from a crosshead 163 in turn joining a pair of parallel rods 164 slidably mounted in apertures 166 in the main framework of the machine and at their upper end joined to the gate 23.

During the first half of the rotation of the disc 141, the gate 23 is lifted to afford unobstructed access from the exterior into the compartment 21. The reverse movement of the gate 23 occurs during the latter half of the rotation of the disc 141, so that the gate is returned to closed position cutting off connection from the exterior to the compartment 21.

In the event an obstruction should present itself beneath the gate 23, there is provided a yielding means for precluding injury to the obstruction and to the mechanism. This comprises a spring 167 which is confined between an ear 168 on one part of the lever 158 and an adjusting nut 169 carried on a bolt 171 mounted on an ear 172 projecting from the other portion of the lever 158. Since the two parts of the lever are connected by a pivot pin 173, there is afforded a yielding connection, which permits buckling of the lever under urgency of a force superior to that of the spring 167.

When the cam 101 contacts the roller 103 and through the lever 102 oscillates the shaft 104, not only is the lever 108 lifted to cause engagement of the clutch pawl 117, but likewise the lever 106 is lifted thereby interposing a projection 174 in the path of the arm 111. When the disc 112 makes approximately one-half of a rotation, the lever 111 contacts the projection 174 and the pawl 117 is withdrawn from the notch 115 thereby disengaging the driving shaft 48 from the discs 112 and 141. Both of these discs therefore make a half rotation before they are interrupted in their movement. Also at the time the levers 106 and 108 are originally lifted, the shoulder 177 on the intermediate link 107 lodges on the latch lever 176. This mechanism therefore latches or holds the discs 112 and 141 in half cycle position indefinitely.

In order that the operation of the machine will not be completed until such time as a filled cup has been manually removed from the compartment 21, but will complete its operation promptly after such removal, there is provided means responsive to the weight of a filled cup for governing the operation of the clutch levers 106 and 108. To this end the bottom of the compartment 21 is provided with a platform 201 which is vertically movable together with supporting rods 202 reciprocable in suitable guides in the frame work of the machine. A pin 203 mounted in a crosshead 204 joined to the rods 202 is connected to a dash pot 206, for cushioning the motion of the platform 201, and likewise projects into slot 207 piercing one end of a lever 208 at its center pivoted on a fulcrum 209 and at its opposite end connected by a link 211 to a bell crank 212. The link 211 carries a counterweight 213, while the bell crank 212 is provided with a pin 214 operating in a slot 216 at the upper end of the lever 176.

As a cup which rests on the platform 201 is being filled, it increases in weight until it overcomes the opposing force of the counterweight 213, at which time the bell crank 212 is oscillated to bring the pin 214 to the end of the slot 216. The link 107 is positively retained in lifted position, thereby holding the pawl 117 disengaged due to contact between the lever 111 and the pawl 174. When, however, the filled cup is removed from the platform 201, the then superior force of the counterweight 213 not only removes the pin 214 from the end of the slot 216 but retracts the lever 176 from beneath the shoulder 177 thereby permitting the link 107 and the pawl 174 to become disengaged from the arm 111 and the lever 108 to return to its original position. The discs 112 and 141 are therefore coupled to the driving shaft 48 for further rotation which is substantially a half revolution, or until such time as the arm 111 again contacts the pawl on the lever 108 and the pawl 117 is disengaged from the notch 115. During the last half of the rotation of the discs 112 and 141, the ring 129 is raised to an extreme upper position, at which time the cup dispenser is actuated thereby releasing a cup into the ring which lowers it to an intermediate position while the dispenser is being restored to its normal position. All of this occurs while the gate 23 is being lowered from its upper position to its lowermost position, so that all of the parts are restored to their original position.

In the ordinary operation of the machine, the beverage is continually circulated in order to maintain its homogeneous character. The gate 23 is ordinarily closed, in order to isolate the interior of the machine from its surroundings. A cup is in position ready to receive a charge of beverage and is partially confined by the supporting ring 129. The platform 201 is in a raised position while the spout 36 is returning the circulating beverage to the reservoir. Upon the introduction of a coin and the operation of the mechanism 67, the spout 36 swings over the cup and discharges a predetermined quantity of beverage thereinto. At the completion of this charging operation the gate 23 rises to afford access to the filled cup which has sunk with the platform 201 to hold the mechanism inoperative for an indeterminate period. In the meantime the spout 36 has returned to its inoperative position, and the supporting ring 129 has descended into contact with the floor of the compartment 21. Whenever the filled cup is withdrawn from the compartment 21, the platform 201 again rises, the gate 23 gradually descends into closed position, the supporting ring 129 rises to its uppermost position and there receives a cup simultaneously released from the dispensing mechanism, which is then restored to inactive position. Following this, the supporting ring 129 returns to an intermediate position. The entire structure has then completed a cycle and is ready for a subsequent operation.

We claim:

1. A dispensing machine comprising a cup magazine, means for releasing a cup from said magazine, a counterbalanced platform constrained to vertical movement for receiving said released cup, means movable into a position over said received cup for filling said cup with a fluid, and means responsive to movement of said counterbalanced platform for interrupting further operation of said machine.

2. A dispensing machine comprising means adapted to operate in a cycle including means movable into a position directly over a cup for filling said cup and supporting means vertically movable in response to the weight of a filled cup, and means controlled by vertical movement only of said cup-supporting means for interrupting completion of said cycle.

3. A dispensing machine comprising a cup support, a cup magazine vertically aligned with said support adapted to release a cup onto said support, and means vertically reciprocable between said magazine and said support for encircling and transferring a cup released from said magazine to said support.

4. A dispensing machine comprising a cup support, a cup magazine vertically aligned with said support, and a cup-carrying ring adapted to approach said magazine to encircle a cup released therefrom and to approach said support to deposit said cup thereon.

5. A dispensing machine comprising a compartment, a movable gate closing said compartment, means for positioning a cup within said compartment, means movable from outside said compartment into said compartment for filling said cup within said compartment, means for moving said gate to open position upon completion of said filling operation, and means effective upon the removal of said cup from said compartment for moving said gate to closed position.

6. A dispensing machine comprising a compartment, a movable gate for closing said compartment, means for disposing a filled cup within said compartment, means independent of said filled cup for moving said gate to open position, and means responsive to the removal of said filled cup from said compartment for moving said gate to closed position.

7. A dispensing machine comprising a compartment adapted to be closed, means for establishing a filled cup within said compartment, means independent of the filling of said cup but normally effective when said cup is filled for opening said compartment, and means effective upon the withdrawal of said cup from said compartment for restoring said compartment to closed condition.

8. A dispensing machine comprising a closed compartment, means for affording access to said compartment, means for dispensing a fluid within said compartment, and means for operating said affording means independently of the dispensing of said fluid to permit withdrawal of dispensed fluid from said compartment and to restore said compartment to closed condition upon such withdrawal.

9. A dispensing machine comprising a liquid supply tank, means including a movable spout for circulating said liquid in a closed circuit, means for positioning a cup in a predetermined location, and means for moving said spout to interrupt said circulation in a closed circuit and discharge said liquid into said cup.

10. A dispensing machine comprising a movable spout, means periodically effective in regular cycles during the operation of the machine for discharging liquid from said spout, and means operative in time with said cycles for effecting all of the movement of said spout between said cycles.

11. A dispensing machine comprising a normally closed compartment, means including a movable spout for circulating liquid in a circuit outside of said compartment, and means for moving said spout into said compartment for discharging liquid therein.

12. A dispensing machine comprising a source of liquid to be dispensed, means for circulating said liquid from said source through a closed circuit returning to said source, a spout and a return pipe included in said circuit and normally in communication, and means operating in time with said circulating means for moving said spout and return pipe out of communication to interrupt said closed circuit.

13. A dispensing machine comprising a source of liquid to be dispensed, means including a spout and a return pipe normally in communication providing a closed circuit for circulation of said liquid from and to said source, means for circulating said liquid through said circuit in successive cycles, and means effective between said cycles for moving said spout to interrupt said circuit.

14. A dispensing machine comprising a source of liquid to be dispensed, means including a spout and a return pipe normally in communication for providing a closed circuit for circulation of said liquid from and to said source, and means for circulating said liquid through said circuit in successive cycles.

15. A dispensing machine comprising a cup magazine, means for releasing a cup from said magazine, means below said magazine for supporting said released cup, a return tube extending to a source of liquid, and a spout extending from said source of liquid movable from a position over said return tube into a position between said magazine and said released cup for discharging into said cup.

16. A dispensing machine comprising a cup support, a cup magazine above said support adapted to release a cup onto said support, a return tube extending to a source of liquid, a cup-filling means extending from said source of liquid, and means for moving said cup-filling means between a position over said return tube and a position over a cup on said support.

CHARLES ZOOK SUTTON.
OTTO M. EASH.